United States Patent [19]

Nield

[11] 3,929,710

[45] Dec. 30, 1975

[54] POLYMER COMPOSITIONS

[75] Inventor: Eric Nield, Watton-at-Stone, England

[73] Assignee: Imperial Chemical Industries Limited, London, England

[22] Filed: Apr. 30, 1974

[21] Appl. No.: 465,556

Related U.S. Application Data

[63] Continuation-in-part of Ser. No. 357,573, May 7, 1973, abandoned, which is a continuation-in-part of Ser. No. 207,975, Dec. 14, 1971, abandoned, which is a continuation-in-part of Ser. No. 118,191, Feb. 23, 1971, abandoned.

[30] Foreign Application Priority Data

Feb. 23, 1970 United Kingdom.................. 8477/70
Nov. 10, 1970 United Kingdom............... 53346/70

[52] U.S. Cl. ........ 260/30.8 R; 260/85.5 S; 260/879
[51] Int. Cl.² ........................................... C08K 5/42
[58] Field of Search ............................... 260/30.8 R

[56] References Cited

UNITED STATES PATENTS

| | | | |
|---|---|---|---|
| 2,811,505 | 10/1957 | Schulken | 260/30.8 R |
| 3,192,178 | 6/1965 | Basdekis | 260/30.8 R |
| 3,580,974 | 5/1971 | Lee | 260/876 R |
| 3,654,323 | 4/1972 | Clark | 260/30.8 R |

FOREIGN PATENTS OR APPLICATIONS 1,143,408  2/1969  United Kingdom

*Primary Examiner*—Paul R. Michl
*Attorney, Agent, or Firm*—Cushman, Darby & Cushman

[57] ABSTRACT

A composition having improved processability is provided comprising from 92 to 99% by weight of a thermoplastic polymer containing 66.7% to 95% molar of acrylonitrile (calculated independently of any diene rubber which may be present) and 8% to 1% by weight of at least one processing aid selected from sulphones.

14 Claims, No Drawings

POLYMER COMPOSITIONS

This application is a continuation-in-part of my U.S. application Ser. No. 357,573 filed May 7, 1973.

U.S. application Ser. No. 357,573 was a continuation application of U.S. application Ser. No. 207,975 filed Dec. 14, 1971. The latter was a continuation-in-part application of Ser. No. 118,191 filed Feb. 23, 1971.

All these earlier applications, the disclosures of which are incorporated herein by reference, are now abandoned.

This application relates to polymeric materials containing a high proportion of acrylonitrile and in particular to compositions having improved processability.

Copolymers containing a high proportion of acrylonitrile including those containing aromatic olefine, those toughened by blending with compatible graft copolymers and graft copolymers having a superstrate of the acrylonitrile copolymer, may be injection moulded to produce articles having high impact strength but the impact strength measured on samples taken across the direction of flow may be lower than that measured on samples taken along the line of flow due to alignment of the molecules during moulding. The problem is more acute with polymeric materials containing a high proportion of acrylonitrile compared with those having only low acrylonitrile content on account of higher melt viscosities which occur for similar molecular weights and moulding temperatures. We have found in general that where the copolymers require the properties to be modified by the addition of additives (for example plasticisers, or graft copolymers for toughening) additives which are conventionally used for materials containing a higher molar proportion of aromatic olefine than acrylonitrile (hereinafter referred to as ABS materials) are not suitable for use with polymers containing high proportions of acrylonitrile due to poor compatibility between the two components. Poor compatibility gives rise to poor physical properties such as lower tensile strength and lower impact strength.

It has now been found that the flow properties of copolymers containing a high proportion of acrylonitrile may be improved by incorporating a small amount of a selected sulphone.

According to the present invention, a composition having improved processability is provided comprising from 92 to 99% by weight of a thermoplastic polymer containing 66.7% to 95% molar of units of acrylonitrile which is a copolymer and/or a superstrate of a graft copolymer having a diene rubber substrate, the amount of acrylonitrile present being calculated independently of any diene rubber which may be present, and 8% to 1% by weight of at least one processing aid selected from sulphones which have the general formula $R^1$-$SO_2$-$R^2$

where $R^1$ and $R^2$ are selected from the group consisting of aromatic radicals, the processing aid being a liquid at the temperature employed during the processing.

The thermoplastic polymer used in the compositions of the invention may be:

1. a homogeneous copolymer comprising of acrylonitrile and units from at least one aromatic olefine;
2. a copolymer of acrylonitrile with at least one ethylenically unsaturated monomer copolymerisable therewith;
3. a superstrate of a graft copolymer having a diene rubber substrate;
4. a homogeneous copolymer of acrylonitrile blended with a compatible graft copolymer;
5. a superstrate of a graft copolymer having a diene rubber substrate blended with a compatible resin;
6. a copolymer of acrylonitrile blended with a compatible graft copolymer.

Polymers containing more than 95% molar of acrylonitrile are excluded because they are not generally thermoplastic but have to be fabricated from solution rather than by thermoplastic melt-processing.

Homogeneous copolymers may be made by any suitable means such as for example those described in British Patent Specifications Nos. 663,268 and 1,185,305. The homogeneous copolymer, however, becomes increasingly difficult to melt-process as the molar concentration of acrylonitrile increases, particularly when the concentration exceeds 85%. However, progressively reducing the acrylonitrile content results in reduced strength, stiffness, impermeability and resistance to chemical attack so that to obtain the optimum values for such properties it is preferable that the acrylonitrile content be at least 75% molar. Compositions according to the present invention provide more facile melt forming whilst not impairing the desirable physical properties of the resultant product. For ease of moulding, it is also preferably to control the molecular weight of the homogeneous copolymer such that the reduced viscosity of the copolymer (measured on a solution of 0.5 g of copolymer in 100 cm³ of dimethyl formamide at 25°C) lies between 0.5 and 1.2 when the acrylonitrile content is less than 80% molar and lies between 0.5 and 1.8 when the acrylonitrile concentration is 80% molar or more.

The impact strength of such homogeneous copolymers may be improved by blending with a compatible graft copolymers, and such a blend is therefore often preferred as a moulding material. Where a graft copolymer is blended with the resin copolymer, the two must be compatible. In order to obtain compatibility, the molar proportion of acrylonitrile in the graft copolymer should be approximately the same as the molar proportion of acrylonitrile in the resin copolymer. However, the proportions of acrylonitrile in the two components may differ by about 10 mole % without unduly affecting the compatibility. Grafts containing a diene rubber substrate such as polybutadiene and a superstrate which is a copolymer of acrylonitrile and at least one ethylenically unsaturated monomer such as acrylonitrile/isobutene copolymer or an acrylonitrile/acrylic or methacrylic ester copolymer (for example as described in British Patent Specification No. 1,143,408) or grafts having a superstrate of a homogeneous acrylonitrile/styrene copolymer (for example as described in British Patent Specification No. 1,185,306) are very suitable. The toughness of the final blended composition is given not only by the amount of rubber it contains (preferably 1% to 50% by weight) but also by the proportion of superstrate in the graft copolymer used for blending. In general, the desirable physical properties such as hardness, gloss, resistance to chemical attack and softening point, of polymeric resins containing a high proportion of acrylonitrile, are adversely effected to a minimum degree when the proportion of superstrate in the graft copolymer is at a minimum. However, there must be sufficient superstrate to provide compatibility between the graft and the resin. While graft copolymers may be used in which the substrate represents from 10% to 95% by weight of the graft copolymer, those containing at least 70% by weight of substrate are generally convenient.

The processing aid may be any sulphone of the general formulae described hereinbefore, or it may be a mixture of two or more of such sulphones, which is a liquid at the temperature employed during the moulding process. For shaping the copolymers, temperatures of at least 150°C are normally required, and it is preferred to avoid temperatures greater than 300°C since thermal degradation may occur rapidly at such high temperatures. The most suitable temperature, however, will depend on the particular copolymer selected. Suitable sulphones include diphenyl sulphone and bis-(4-chlorophenyl) sulphone.

Incorporation of from 1 to 8% by weight of the present processing aids reduces the melt viscosity of the polymeric material, resulting in a more even distribution of physical properties in an injection-moulded article. Thus the notched impact strength measured across the line of flow is increased and may be as high as the value measured along the line of flow. However, the Vicat softening point may be reduced as the quantity of processing aid is increased, and compositions containing about 4 to 8% by weight of processing aid are particularly preferred.

The processing aid may be incorporated in the composition at any stage of its preparation. Where the polymeric material comprises a blend of a resin copolymer and a graft copolymer formed by blending the latices of the two copolymers, the processing aid may very conveniently be added during the blending stage. It may, however, be added to the polymerisation mixture during the course of the preparation of the resin copolymer. Alternatively, the processing aid may be added to the polymer composition by means of melt-blending either using an extruder or using hot rolls.

Compositions according to the invention may be mixed with any desired fillers, stabilisers and other additives. Compositions of the present invention may be fabricated by any method available to the processing of thermoplastic materials. The compositions can therefore be compression-moulded; blow-moulded; extruded; calendered and cast into films; moulded into plaques, bottles and other articles.

In the following examples, the notched impact test was carried out at room temperature (about 20°C). A specimen 50 mm long, 6 mm wide and 3 mm thick was given a 45° notch 2.5 mm deep (tip radius 0.25 mm) in the centre of one edge. It was supported between two supports 38 mm apart and struck centrally on the edge opposite the notch by a pendulum dropping from 30 cm with more than sufficient energy to break the specimen. From the residual energy of the pendulum, the energy required to break the specimen was calculated and divided by the cross-sectional area of the specimen at the notch. The resulting value represents the energy required to break the material.

The unnotched impact strength was measured on a specimen 9 mm wide and 3 mm thick resting horizontally (with the narrow face uppermost) against two supports 38 mm apart. The specimen was struck centrally on the wide face by a horizontally moving pendulum falling from 305 mm, with normally sufficient energy to break the specimen. From the residual energy of the pendulum, the energy required to break the specimen was calculated and then divided by the cross-sectional area of the specimen. The resulting value (expressed in $kJ/m^2$) represents the energy required to cause cracks and break the material.

The modulus was measured as the tensile creep modulus at 100 seconds and 0.2% strain.

Permeability was measured according to the pressure differential method of N T Notley which is described in Journal of Applied Chemistry 1963, volume 13, page 107. The measurements were made using essentially dry gases at 30°C using a pressure differential of 1 atmosphere.

The following examples illustrate the invention; parts and percentages are by weight.

EXAMPLE 1

A copolymer blend A was prepared by latex blending a graft copolymer comprising a substrate of polybutadiene (about 50%) and a superstrate (about 50%) of a homogeneous acrylonitrile/styrene copolymer (molar ratio 3:1) and a resin comprising a homogeneous acrylonitrile/styrene copolymer (molar ratio 3:1) in such proportions that the blend contained 10% polybutadiene. The blend was stabilised with 1% of 2,6-di-t-butyl-4-methylphenol and 0.5% of dilauryl thiodipropionate. The copolymer blend (100 parts) was mixed in a Banbury mixer (chart temperature 115°C) with a series of additives indentified in Table 1 below, some difficulty being experienced with additive C. After mixing, the composition was milled, the front roll having a temperature of 130°–135°C, and the crepe was cut and diced in a Masson cutter. The melt viscosity of each composition was measured at a rate of 1000/sec and temperature of 260°C except where indicated, and the colour recorded after 10 minutes at 260°C. When the samples set up, (i.e. the viscosity of the molten polymer rose sharply), the time which elapsed before the onset of setting up was also measured, and is identified in Table 1 as the 'set up time'.

Table 1

| Additive | | Quantity of additive parts by weight | Melt viscosity ($Nsm^{-2}$) | Set up time minutes | Colour (10 minutes) |
|---|---|---|---|---|---|
| A | None | | 39 | 50 | Very pale yellow orange |
| B | diphenyl sulphone | 5 | 27 | 50 | Very pale yellow orange |
| C | bis-(4-chlorophenyl) sulphone | 5 | 31 | 50 | Colour stable |
| D | (diphenyl sulphone (tristearyl citrate | 5) 2) | 33 | 60 | Colour stable |
| E | tristearyl citrate | 2 | 40 | 45 | Very pale yellow orange |

The mechanical properties of compression-moulded samples of the compositions were measured and are given in Table 2.

Table 2

| Additive | Notched Impact strength kJ/m² | Modulus GN/m² | Vicat softening point °C one-tenth | full |
|---|---|---|---|---|
| A | 10.6 | 3.1 | 103.4 | 109.4 |
| B | 12.7 | 3.2 | 93.6 | 102.8 |
| C | 7.4 | 3.0 | 98.6 | 105.6 |
| D | 11.9 | 3.1 | 96.0 | 102.0 |
| E | 11.2 | 2.9 | 102.6 | 110.4 |

The notched impact strengths of the compositions were also measured on samples injection-moulded at 200°C or 230°C. Samples for test were taken along or across the direction of flow.
The results are given in Table 3.

Table 3

| Additive | Notched impact strength (kJ/m²) 200°C along flow | across flow | 230°C along flow | across flow |
|---|---|---|---|---|
| A | 11.0 | 2.2 | 9.4 | 2.1 |
| B | 10.6 | 2.5 | 11.9 | 2.2 |
| C | 11.8 | 2.5 | 12.3 | 1.9 |
| D | 15.6 | 8.0 | 14.0 | 9.7 |
| E | 15.1 | 8.4 | 15.9 | 8.4 |

1000/sec) and the results of physical testing on samples compression-moulded at 260°C are shown in Table 4.

Table 4

| Composition | Melt Viscosity (Nsm⁻²) 180°C | 220°C | 260°C | Modulus GN/m² | Notched impact strength kJ/m² |
|---|---|---|---|---|---|
| K | 22 | 7.6 | 4.0 | 3.0 | 18.8 |
| L | 17.5 | 5.3 | 2.9 | 3.1 | 21.2 |

These results show that diphenyl sulphone reduces the melt viscosity at all melt temperatures within the range normally used for melt processing.

The same blend (J) (100 parts) was compounded with 5 parts of diphenyl sulphone using a Banbury mixer (chart temperature 115°C), milled (front roll temperature 130°–135°C), Masson-cut and finally injection-moulded into 114 mm diameter, 3.2 mm thick discs. The notched impact strengths of the moulded discs of the resultant composition (M) were measured for samples taken both along and across the direction of flow, and the values obtained are compared with those for the blend (J) containing no diphenyl sulphone, the results being given in Table 5.

Table 5

| Moulding conditions Temperature °C | Notched impact strength (kJ/m²) 20.5°C along | across | 0°C along | across | −20°C along | across |
|---|---|---|---|---|---|---|
| Composition J | | | | | | |
| 200 | 19.2 | 12.1 | | | | |
| 230 | 15.3 | 12.8 | 8.3 | 6.3 | 6.3 | 3.4 |
| Composition M | | | | | | |
| 200 | 19.3 | 11.4 | 8.5 | 5.7 | 7.4 | 4.2 |
| 230 | 16.1 | 9.8 | | | | |

EXAMPLE 2

Two compositions were prepared by compounding 9725 g of a blend (J) containing 10% polybutadiene, in the form of a graft copolymer comprising about 50% polybutadiene substrate and acrylonitrile/styrene (molar ratio 3:1) superstrate and a homogeneous acrylonitrile/styrene resin containing 27.3% mole % styrene, (K) with no additive and (L) with 486.25 g of diphenyl sulphone. The compositions were made in a 38 mm Bone extruder having a vented barrel, and 3.8 mm die. In the preparation of composition L, the blend and the sulphone were first mixed in a Henschel mixer and then in the Bone extruder. In both cases the recorded barrel temperatures of the extruder were 165/200/208/190/180°C where the temperature of 180°C represents the die temperatures. The screw speed in each case was 50 r.p.m. The melt viscosities at 180°C, 220°C and 260°C (measured at a rate of

EXAMPLE 3

The following compositions were made by adding various quantities of bis-(4-chlorophenyl) sulphone to 1500 g of a blend (N) which consisted of a resin comprising a homogeneous acrylonitrile/styrene resin containing 22.3 mole % styrene, a graft copolymer comprising about 50% of a substrate of polybutadiene and correspondingly about 50% of a superstrate of a homogeneous acrylonitrile/styrene copolymer (molar ratio 3:1), the amount of graft polymer being such that blend (N) contained 10% polybutadiene; blend (N) also contained 2% of tristearyl citrate. The materials were compounded on a Banbury mixer (at 140°–150°C), milled (at 160°C) and Masson-cut. The compositions produced were divided, part being compression-moulded at 200°C for 5 minutes while the remainder were injection-moulded at temperatures of 200°C and 230°C. The mechanical properties of the mouldings are given in Table 6 for compression mouldings and Table 7 for injection mouldings.

Table 6

| Composition | bis-(4-chlorophenyl sulphone g | wt % | Vicat Softening point °C one-tenth | full | Melt viscosity (Nsm$^{-2}$) | modulus GN/m$^2$ | Notched impact strength kJ/m$^2$ |
|---|---|---|---|---|---|---|---|
| N | 0 | 0 | 99.0 | 110.2 | 5.3 | 3.1 | 15.0 |
| O | 30 | 2 | 102 | 108 | 4.7 | 3.2 | 19.8 |
| P | 60 | 4 | 100.4 | 105.6 | 4.2 | 3.1 | 21.4 |
| Q | 90 | 6 | 90.0 | 102.2 | 4.3 | 3.2 | 21.2 |
| R | 120 | 8 | 94.6 | 101.8 | 4.0 | 3.2 | 17.7 |
| S | 150 | 10 | 94.4 | 99.8 | 3.5 | 3.3 | 20.6 |

Table 7

| | Notched impact strength at 19.5°C (kJ/m$^2$) | | | |
|---|---|---|---|---|
| | Injection-moulded at 200°C | | Injection-moulded at 230°C | |
| Composition | along flow | across flow | along flow | across flow |
| N | 28.4 | 12.9 | 30.1 | 11.4 |
| O | 32.6 | 11.7 | 28.6 | 12.7 |
| P | 28.4 | 17.4 | 28.2 | 18.2 |
| Q | 27.9 | 10.8 | 30.9 | 15.1 |
| R | 25.6 | 17.6 | 30.9 | 18.2 |
| S | 25.8 | 18.9 | 24.4 | 18.9 |

EXAMPLE 4

A series of homogeneous copolymers of acrylonitrile and styrene containing 75, 85 and 90% molar acrylonitrile were prepared by the method described in British specification No. 1,185,305. Samples of the copolymers were mixed with varying amounts of diphenyl sulphone and the melt viscosity (measured at 200°C) of the resulting composition, the unnotched impact strength of test pieces moulded from the composition and permeability of films prepared from the composition determined. The results are presented in Table 8.

Table 8

| Acrylonitrile (% molar) | Diphenyl sulphone (parts by weight per hundred parts copolymer) | Melt viscosity (Nsm$^{-1}$) | Unnotched impact strength kJ/m$^2$ | Permeability mole ms$^{-1}$ N$^{-1}$ | |
|---|---|---|---|---|---|
| | | | | O$_2$ | CO$_2$ |
| 75 | 0 | 710 | 14.1 | | |
| | 5 | 510 | 15.4 | | |
| | 10 | 400 | 14.6 | | |
| | 15 | 290 | 12.6 | | |
| 85 | 0 | 960 | 20.7 | 2.0×10$^{-18}$ | 1.9×10$^{-18}$ |
| | 5 | 620 | 21.2 | 1.5×10$^{-18}$ | 2.8×10$^{-18}$ |
| | 10 | 450 | 13.8 | | |
| 90 | 0 | 1900 | 17.9 | 4.1×10$^{-19}$ | <10-19 |
| | 5 | 650 | 4.2 | 3.1×10$^{-19}$ | <10-19 |
| | 10 | 510 | 18.1 | | |

The results given in Table 8 show that (1) melt viscosity rises with acrylonitrile content; (2) melt viscosity decreases with increasing diphenyl sulphone concentration substantially without detriment to unnotched impact strength and with marginal improvement in oxygen impermeability and (3) impermeability improves with increasing acrylonitrile content.

EXAMPLE 5

Samples of "Barex" 210 ("Barex" is a registered Trade Mark) which is a nitrile rubber modified acrylonitrile-methyl acrylate copolymer consisting of copolymer produced by the graft copolymerisation of 73-77 parts by weight of acrylonitrile and 23-27 parts by weight of methyl acrylate in the presence of 8-10 parts by weight of butadiene-acrylonitrile copolymers containing approximately 70 percent by weight of polymer units derived from butadiene, were mixed with diphenyl sulphone and "Santicizer" IH and the resulting compositions evaluated for melt viscosity (measured at 200°C) and unnotched impact strength. The results (Table 9) show that diphenyl sulphone is more efficient in reducing melt viscosity than "Santicizer" IH.

Table 9

| Additive (parts by weight per hundred parts resin) | Melt Viscosity (Nsm$^{-2}$) | Unnotched impact strength |
|---|---|---|
| 0 | 980 | 8.2 |
| 5(Diphenyl sulphone) | 800 | 15.3 |
| 5("Santicizer" IH) | 1050 | 5.74 |

I claim:

1. A composition having improved processability comprising from 92 to 99% by weight of a thermoplastic polymer containing 66.7% to 95% molar of units of acrylonitrile which is a copolymer and/or a superstrate of a graft copolymer having a diene rubber substrate, the amount of acrylonitrile present being calculated independently of any diene rubber which may be present, and 8% to 1% by weight of at least one processing aid selected from the group consisting of diphenyl sulphone and bis-(4-chlorophenyl) sulphone, the processing aid being a liquid at the temperature employed during the processing.

2. A composition according to claim 1 in which the thermoplastic polymer is a homogeneous copolymer comprising 66.7% to 95% molar of units from acrylonitrile and 33.3% to 5% molar of units from at least one aromatic olefine.

3. A composition according to claim 1 in which the thermoplastic polymer is a copolymer of acrylonitrile with at least one ethylenically unsaturated monomer copolymerisable therewith.

4. A composition according to claim 1 in which the thermoplastic polymer is a superstrate of a graft copolymer having a diene rubber substrate.

5. A composition according to claim 1 in which the thermoplastic polymer is a homogeneous copolymer of acrylonitrile blended with a compatible graft copolymer having a diene rubber substrate and a superstrate containing acrylonitrile (45 to 90% molar) the amount of diene rubber in the blend being 1 to 50% by weight.

6. A composition according to claim 1 in which the thermoplastic polymer is a superstrate of a graft copolymer having a diene rubber substrate blended with a compatible resin containing acrylonitrile (66.7 to 95% molar), the amount of diene rubber in the blend being 1 to 50% by weight.

7. A composition according to claim 1 in which the thermoplastic polymer is a copolymer of acrylonitrile blended with a compatible graft copolymer having a diene rubber substrate and a superstrate containing acrylonitrile (45 to 90% molar) the amount of diene rubber in the blend being 1 to 50% by weight.

8. A composition according to claim 1 in which any aromatic olefine present is styrene and/or alpha-methyl styrene.

9. A composition according to claim 1 in which the processing aid is present in concentration 4 to 8% by weight.

10. A composition according to claim 1 in which the processing aid is diphenyl sulphone.

11. A composition according to claim 1 in which the processing aid is bis-(4-chlorophenyl) sulphone.

12. A composition according to claim 1 in the form of a molded article.

13. A composition according to claim 12 in which the molded article is a bottle.

14. A composition according to claim 1 in the form of a film.

* * * * *